United States Patent Office 3,545,264
Patented Dec. 8, 1970

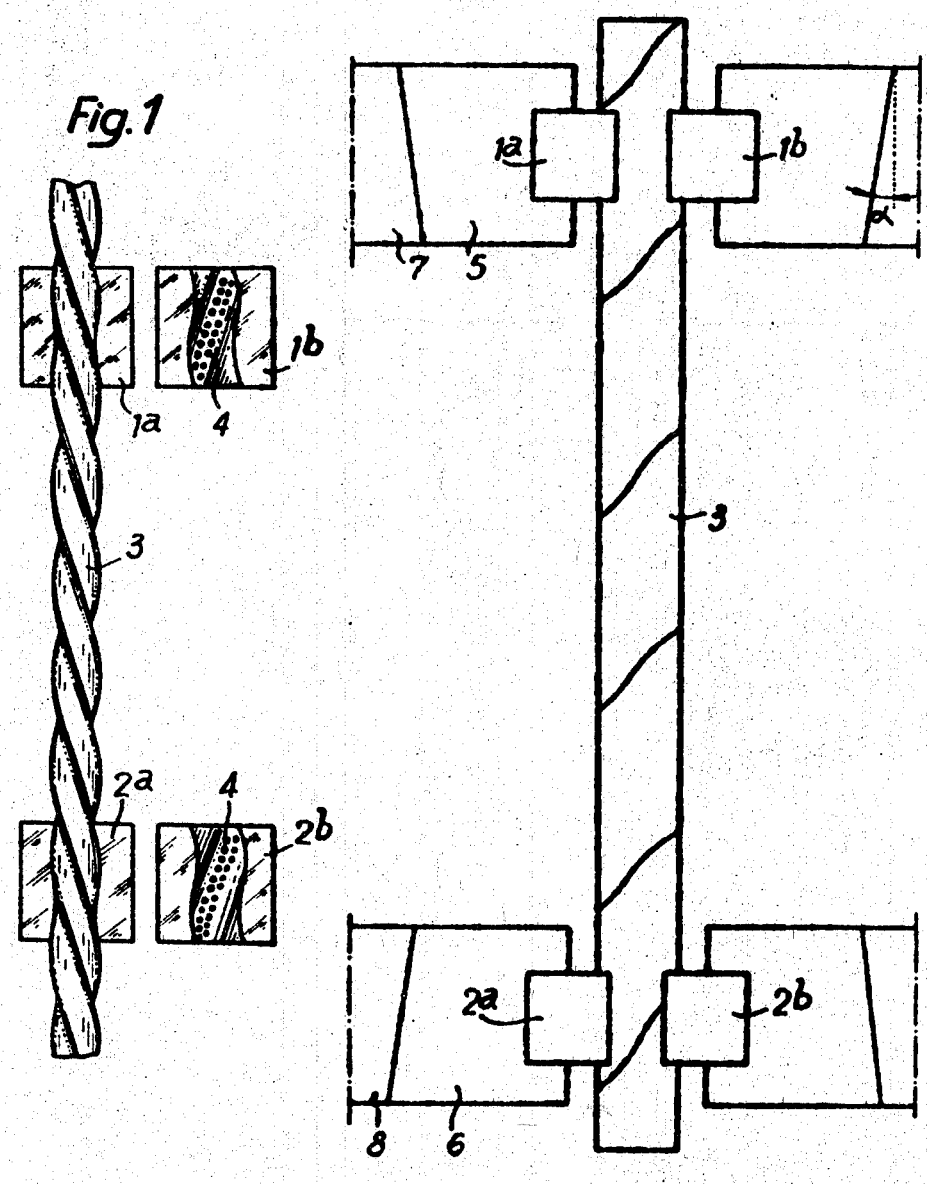

3,545,264
METHOD AND APPARATUS FOR TENSILE TESTING OF STEEL BARS
Robert Bourgeois, Maubeuge, and Adolphe Lesure, Anzin, France, assignors to Societe dite: Usinor, Paris, France, a company of France
Filed May 3, 1968, Ser. No. 726,385
Int. Cl. G01n 3/04
U.S. Cl. 73—103                          8 Claims

ABSTRACT OF THE DISCLOSURE

Jaws for gripping cold twisted steel bar during tensile test on bar have internal profile matching surface of bar. Jaws made by drilling hole in block having twice the thickness of a jaw, cutting block in half through the hole form jaw blanks, heating blank, and stamping blank with a portion of twisted bar serving as a stamping die.

---

To carry out tensile tests on steels, conventional V jaws are used which are very suitable for fracturing cylindrical machined test pieces.

However, for cold twisted steels, which have their external portions cold worked, no preliminary machining of the test piece is possible, simply because of the cold working of the external molecules which gives the steels their guaranteed mechanical properties. Therefore, it is necessary to fracture these test pieces in the rough state, that is to say in the form of bar lengths.

Furthermore, bars of considerable cross-section which have a high ultimate breaking load have to be broken on a tensile machine of great power, for example 50 or 100 tons. To prevent slipping of the test piece during testing, therefore, it has been thought appropriate to use V jaws with considerable grooving.

It is then found, with cold twisted steels of considerable cross-section i.e. with a diameter greater than or equal to 25 mm., that the value of the horizontal compressive stresses exerted by the grooved V jaws goes beyond the elastic limit of the metal of the test piece so that a permanent deformation thereof occurs, and its cross-section is reduced. Fracture occurs level with the jaws and the test cannot be regarded as significant.

The present invention provides improvements which, obviating the aforesaid disadvantages, enable tensile tests to be carried out from cold twisted steels of large cross-section.

For this purpose, according to the invention the tests are carried out by using jaws having an internal cross-section matching the surface of the twisted bar so as to ensure, by close and continuous clamping of the bar, a uniformly distributed pressure which does not damage the clamp parts.

Such jaws are obtained preferably by hot stamping, using as a stamping die the length of bar which is to be clamped in the jaws during the tensile test.

More precisely, it is possible for example to choose a block of material having the required qualities and being twice the thickness of half a jaw, anneal the said block and then drill in the middle of its thickness, in the clamping direction, a hole of appropriate size which will serve as a seating for the die at the time of stamping, saw the drilled block into two equal parts to obtain two half-jaw blanks and, after having cut to length the bar piece which is to serve as a stamping die, heat the half-jaws and carry out stamping. It is then possible to machine the stamped half-jaws so that they fit into the jaw supports of the tensile testing machine and, if appropriate, quench the finished jaws and subject them to tempering in order to return them to their original quality.

To prevent any slipping of the bar during testing, it is possible to provide in the jaws some circular asperities which are much less penetrative than the conventional grooving of the jaws, and do not damage the bar.

The additional description which follows with the accompanying drawings in support which are given more especially by way of example will make it easy to understand how the invention can be carried into effect.

In these drawings:

FIG. 1 shows a twisted bar element on which two half-jaws have been fitted, the two other half-jaws being turned with their internal face visible, and FIG. 2 is a diagrammatic view of part of a conventional machine for carrying out tensile tests.

To carry out tensile tests on cold twisted steels of large cross-section, that is to say whose cross-section has a diameter equal to or greater than 25 mm., according to the invention jaws are used which have an internal profile matching the surface of the twisted bar so as to ensure, by close continuous clamping of the bar, a uniformly distributed pressure which does not damage the clamped parts.

Such jaws, an example of which is shown in FIG. 1, are obtained preferably by hot stamping, using as a stamping die the bar length which is to be clamped in the jaws during the tensile test, For this purpose, a block of material is chosen which has the desired qualities and has a thickness which is twice that of one of the half-jaws to be produced. This starting material may be a round, a parallelepipedic block or any other geometric solid appropriate to the forms and dimensions of the jaws supports of the testing machines. This block is made of steel having a strength of, for example, equal to or greater than 150 kg./mm.$^2$.

After having annealed the block, a hole of suitable size is drilled in the centre of the thickness of the block, in the proposed direction of clamping, to serve as a seating for the die at the time of stamping. The block is sawn into two equal parts to obtain two half-jaw blanks ready for stamping.

Furthermore, a part of the twisted bar which it is desired to subject to tensile tests and which may have any desired pitch and configuration, is cut off. This bar length is used as a stamping die.

Preferably, in the recessed portions of the blanks which are to serve as seating means for the die, the material is displaced locally in order to form small substantially circular asperities 4.

The half-jaws which are still in the form of blanks are then heated and stamping is carried out in the usual manner in order to obtain the half-jaws such as those illustrated at 1a and 1b and 2a and 2b in FIG. 1.

Then the external forms of the stamped half-jaws are machined so that they fit into the jaw supports of the testing machine, and the finished jaws are subjected to quenching followed by tempering in order to bring them back to their original quality.

Thus, jaws are obtained whose internal profile closely matches the surface of the twisted bar 3 and comprises the small substantially circular asperities 4.

These jaws are positioned in the jaw supports 5 and 6 connected respectively to the mobile cross-member 7 and to the fixed frame 8 of the tensile testing machine (FIG. 2). In order to ensure the appropriate clamping of the bar in the jaws, the jaw supports are generally in the form of wedges which can slide on corresponding inclined surfaces of the mobile cross-member or the fixed frame.

During testing, the vertical tensile force exerted by the machine which tends to move the mobile cross-member 7 away from the fixed frame 8 is transformed into a horizontal clamping compression of the jaws on the twisted bar 3 since the jaw-carrying wedges 5 and 6 in sliding on the inclined surfaces tend to be displaced vertically, making the jaws approach horizontally towards the test piece.

By way of example, and simply in order to give a clearer picture, in the case of a twisted bar whose ultimate breaking load is 76 tons and assuming that the frictional surface of each jaw-carrying wedge is perfectly supplied with graphite lubricant in such a manner that the coefficient of friction $t_g$ etc. is taken as equal to 0.15, with an inclination of the surface of contact of the jaw-carrying wedge on the cross-member or frame forming an angle $\alpha=10°$, it is found that the total compressive stress of each of the half-jaws on the test piece is equivalent to 32,178 tons.

In the case of conventional V jaws the compressive stress per mm.$^2$ of each half-jaw on the test piece is in that case of the order of 80 kg./mm.$^2$, so that the elastic limit is exceeded and there is permanent deformation of the test piece, its cross-section being reduced and the fracture occurring at the level of the jaws. The test is not, therefore, significant.

On the contrary, in the case of the helical jaws according to the invention, the compressive stress per mm.$^2$ of each half-jaw on the test piece is of the order of 7 kg./mm.$^2$, which is less than the elastic limit. The two directly opposed clamping compressions which are balanced at a value below the elastic limit of the metal of the test piece have no effect on the tensile test and breaking occurs normally, the test being significant.

Similar conclusions can be drawn as regards the elongation measured, this being very erroneous, with a value by default and a considerable variation range of results in the case of V jaws whereas on the contrary measurement is substantially constant with the helical jaws according to the invention. For example, with test pieces all coming from one and the same bar, in the case of tests carried out with V jaws elongations equal to 10 and 12% are obtained, whereas with jaws according to the invention the measurements effected at two test pieces both showed an elongation of 19% for twisted bars of reference C40, which are cold twisted bars of a substantially square cross-section.

It will be apparent that the forms of embodiment described have been given more especially by way of example and that many modifications can be made thereto without thereby departing from the framework of the present invention.

What is claimed is:

1. A method of tensile testing cold twisted steel bars having at least a 25 mm. diameter before twisting, the method comprising clamping spaced portions of each cold twisted steel bar using jaws having an internal profile which matches the surface of the twisted bar in order to ensure, by close continuous clamping of the twisted bar, a uniformly distributed pressure which does not damage the clamped parts, the jaws used being obtained by providing two half jaw blanks having opposed substantially semicylindrical grooves, the portion of the twisted bar which is to be clamped in the jaws during tensile testing being placed between the blanks and in the grooves, whereby said bar portion serves as a stamping die, and carrying out a stamping operation with the jaw blanks in heated condition so that the shape of said bar portion is impressed on said blanks, and applying a force to said jaws which is transmitted as a tensile force to a bar clamped between the jaws.

2. A method of tensile testing a twisted steel bar comprising a process of producing jaws wherein a block of material having the required qualities for the jaws and twice the thickness of a half-jaw is selected, is annealed, is drilled centrally of its thickness with a cylindrical hole of suitable dimensions to serve as a seating for a die at the time of stamping, is sawn into two equal parts along the axis of the hole to obtain two half-jaw blanks, and, after having inserted the portion of the twisted bar which is to serve as a stamping die, stamping is carried out with the jaw blanks in heated condition, and using said jaws in tensile testing of the bar.

3. A process according to claim 2 wherein the external surfaces of the stamped half-jaws are machined so that they fit into jaw supports of a tensile testing machine and the machined jaws are thereafter subjected to quenching followed by tempering.

4. A process according to claim 2, wherein small substantially circular asperities are formed in inner die stamped surfaces of the jaws.

5. Jaws whenever produced by the process according to claim 2.

6. A machine for tensile testing cold twisted steel bars of considerable cross-section, the machine comprising jaws according to claim 5, and means for applying a force to said jaws which is transmitted as a tensile force to a bar clamped between said jaws.

7. The process of claim 2 wherein the block is of steel.

8. The process of claim 2 wherein the jaw blanks are quenched and tempered after the hot die stamping operation.

References Cited

UNITED STATES PATENTS

| | | | |
|---|---|---|---|
| 1,723,816 | 8/1929 | Scott | 73—158 |
| 2,025,556 | 12/1935 | Stahl | 29—517X |
| 2,357,733 | 9/1944 | Guderian | 29—517X |
| 2,576,528 | 11/1951 | Matthysse | 29—517UX |
| 2,832,118 | 4/1958 | Ehmann | 29—517X |
| 3,231,964 | 2/1966 | Bennett | 29—517 |

JERRY W. MYRACLE, Primary Examiner

U.S. Cl. X.R.

29—517; 73—158